United States Patent [19]

Shamsutdinov et al.

[11] 3,970,564
[45] July 20, 1976

[54] VERTICAL VIBRATORY LIQUID FILTER

[76] Inventors: Ural Gilyazitdinovich Shamsutdinov, ulitsa Obraztsova, 8a, kv. 99; Jury Viktorovich Gutin, ulitsa Karla Marxa, 20, kv. 38; Alexandr Sergeevich Kupriyanov, Dmitrovskoe shosse, 45, kv. 65, all of Moscow, U.S.S.R.

[22] Filed: Dec. 3, 1974

[21] Appl. No.: 529,114

[52] U.S. Cl. .......................... 210/323 R; 210/388; 210/DIG. 18
[51] Int. Cl.² .................. B01D 29/04; B01D 35/20
[58] Field of Search ........... 210/323, 330, 331, 337, 210/346, 347, 384, 388, DIG. 18; 209/311, 315, 355

[56] References Cited
UNITED STATES PATENTS

| | | | |
|---|---|---|---|
| 969,739 | 9/1910 | Allen | 209/311 X |
| 2,207,399 | 7/1940 | Gaertner | 210/384 X |
| 2,365,360 | 12/1944 | Smith | 210/388 |
| 3,137,652 | 6/1964 | Graue | 210/331 |
| 3,187,898 | 6/1965 | Baker | 210/331 |
| 3,195,729 | 7/1965 | Kracklauer et al. | 210/388 X |
| 3,513,090 | 5/1970 | Migule et al. | 210/388 X |

*Primary Examiner*—Charles N. Hart
*Assistant Examiner*—Robert H. Spitzer
*Attorney, Agent, or Firm*—Steinberg and Blake

[57] ABSTRACT

A vertical vibratory liquid filter comprising a vertical shell with a manifold for feeding in the filtered suspension, a cake-discharge hole located in the lower part of said shell, and filter elements secured on a drain pipe which is set nearly vertical and communicates with the filtrate-discharge pipe connection. The filtering surfaces of the filter elements are inclined towards the discharge hole and their lower edges are located above the discharge hole. The filter elements interact with a vibrator which sets them in vibration for the removal of cake.

6 Claims, 3 Drawing Figures

VERTICAL VIBRATORY LIQUID FILTER

The present invention relates to equipment for filtering suspensions and more particularly it relates to vertical vibratory liquid filters with mechanically-vibrated filter elements.

Known in the previous art is a vertical vibratory liquid filter (Author's Certificate No. 237813, USSR) comprising a vertical shell with a cover on top and a cone-shaped bottom below, said bottom provided with a cake-discharge hole closed by a wedge gate which is operated by a power cylinder. The shell has an intake manifold for the suspension to be filtered.

Arranged vertically in the shell are plate-and-frame filter elements mounted alternatingly with spacer rings on a horizontal perforated drain pipe which communicates with a filtrate-discharging manifold. The spacer rings have T-shaped heads used to fasten the drain pipe with suspended filter elements to a crosspiece which mounts a vibrator intended to vibrate the filter elements in their own plane.

The process of filtration in these filters is typical of pressure batch filters.

The suspension to be filtered is delivered under pressure into the filter shell. The filtrate passes through the filter elements into the drain pipes and is discharged from the filter, leaving a cake on the surface of the filter elements.

The cake is dried by air or inert gas supplied under pressure into the filter shell; passing through the layer of the cake, said air or gas is discharged from the filter to the drain pipes.

For cake removal the vertical filter elements are set in vibration by a vibrating device. As a result, the cake breaks off from the filtering base and is discharged through a guide cone into the open discharge hole.

However, these filters cannot be utilized to separate suspensions with a quick-precipitating solid phase and cannot ensure efficient washing of the cake.

These disadvantages are attributed to the fact that solid particles settle nonuniformly on the vertical surfaces of the filter elements and form a cake of a variable thickness so that the process of filtration becomes correspondingly nonuniform throughout the surface of the filter elements thus reducing the filter capacity.

Besides, the cake does not adhere well to the vertical surface of the filter elements thus excluding the possibility of filling the shell with a cake-washing liquid.

An object of the invention resides in providing a vertical vibratory liquid filter in which the layer of cake on the filter elements would be uniform and would adhere reliably to said elements and which would allow efficient washing of said cake.

This object is achieved by providing a vertical vibratory liquid filter which comprises a vertical shell with a pipe connection for feeding in the filtered suspension, a cake discharge hole located in the lower part of the shell, and filter elements secured on a drain pipe communicating with a filtrate-discharge manifold, said elements interacting with a vibrator which sets them in vibration for removing the cake wherein, according to the invention, the drain pipe is set nearly vertical in the shell and the filtering surfaces of said filter elements are inclined towards the discharge hole, their lower edges being arranged above said hole.

The filters elements can be made in the form of flat inclined leaves.

The filter elements can also be made in the form of cone-shaped plates arranged one above another, with their apices pointing down and with a hole in the middle.

Owing to such an arrangement of the filtering surfaces, the larger part of the cross-sectional area of this filter is covered; as a result, these filtering surfaces retain all the settling solid particles and form a cake of uniform thickness throughout the filtering surface which is of great importance for subsequent washing and drying of the cake and raises the filter capacity. The inclined filtering surface holds the cake more reliably than the vertical filter elements during the discharging and filling of the shell with liquid which allows the cake to be efficiently washed without a danger of washing it down.

Reliable adhesion of the cake to the filtering surface makes it possible to filter the suspension and to wash the cake concurrently with vibration of the filter elements. This extends considerably the field of application of the filter according to the invention by using it as a thickening and washing filter.

The vertical arrangement of the drain pipe improves evacuation of filtrate from inside the filter elements.

Inclination of the filtering surface towards the discharge hole allows the cake to be discharged directly into said hole so that the cake does not come in contact with the walls and bottom of the shell and, consequently, does not stick to them. Besides, there is no need for a special guide cone for the cake discharge.

Now the invention will be described in detail by way of example with reference to the accompanying drawings in which.

Figure 1:
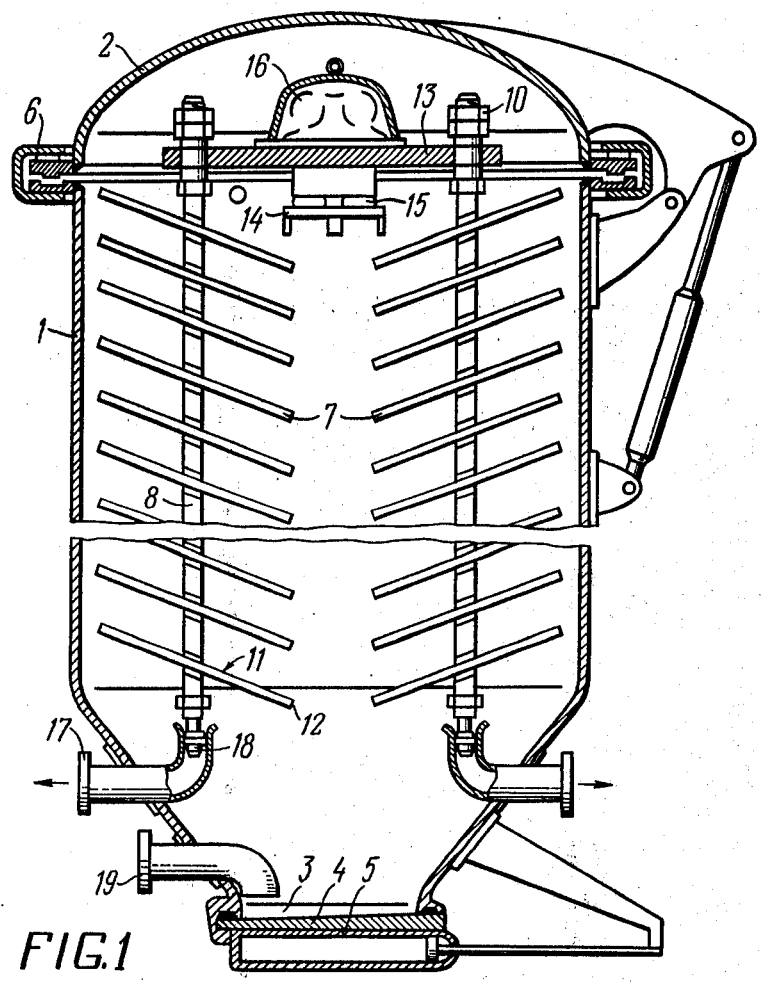
FIG. 1 is a longitudinal section of the vertical vibratory liquid filter according to the invention.

The vertical vibratory liquid filter shown in FIG. 1 comprises a shell 1 closed with a cover on top. The lower cone-shaped part of the shell 1 has a cake-discharge hole 3 closed by a wedge gate 4 which is operated by a power cylinder 5.

The cover 2 is jointed with the shell by a quick-disconnect lock 6. The shell 1 accommodates filter elements in the form of flat leaves 7 mounted alternatingly with spacer rings 8 on two vertical perforated drain pipes 9 (FIG. 2) and secured by nuts 10 (FIG. 1). The flat leaves 7 are arranged so that their filtering surfaces 11 are inclined towards the discharge hole 3 while their lower edges 12 are located above the cake-discharge hole 3. Each pack of the flat leaves 7 combined with a single drain pipe 9 is suspended from a crosspiece 13 which rests freely on supports 14 through shock absorbers 15. A vibrator 16 is rigidly mounted on the crosspiece 13. The lower ends of the drain pipes 9 enter the sockets in filtrate-discharge manifolds 17 and are sealed by rubber rings 18 which allow free vertical displacement of the drain pipes 9. The suspension to be filtered is fed into the shell 1 through a manifold 19.

The flat leaf 7 has a bottom 20 (FIG. 2) with an edging 21 inserted into which is a drain screen 22 covered on top with a filtering material (gauze or fabric). The edging 21 has a space 24 which communicates with the drain pipe 9 through a pipe 25.

The filter elements with filtering surfaces inclined towards the discharge hole can also take the form of cone-shaped plates 26 (FIG. 3) arranged one above another, with their apices pointing down and provided with a hole 27 in the middle. The cone-shaped plates 26 are suspended from a crosspiece 28 on shock absorbers 29. The crosspiece 28 rests on a supporting ring 30. The discharge hole 3 is closed by a swinging device 31.

The filtering surface 32 of the cone-shaped plate 26 is inclined towards the discharge hole 3 and the lower edge 33 of said plate 26 is located above the discharge hole 3.

Figure 2:
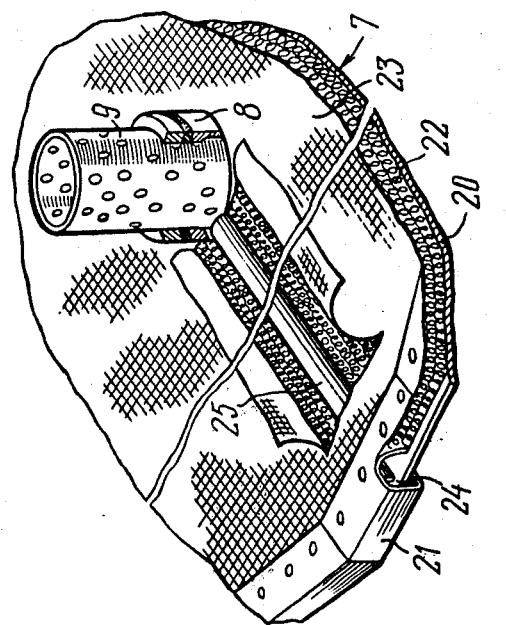
FIG. 2 shows an enlarged filter element of the vertical vibratory liquid filter, partly cut out.

The cone-shaped plates 26 are similar in construction to the filter elements in the form of flat leaves 7 (FIG. 2).

The vertical vibratory liquid filter according to the invention functions as follows.

The suspension to be filtered is fed into the filter through the manifold 19 (FIG. 1) and fills the shell 1. The delivered suspension builds up pressure in the shell 1, passes inside through the filtering material 23 (FIG. 2), flows down into the space 24 then rises under pressure through the pipe 25 into the drain pipe 9 and leaves the filter through the manifold 17 (FIG. 1). The cake remains on the filtering surface 11. After filtration, the remaining suspension is drained from the shell 1 through the pipe connection 19. Then the cake is washed by a washing liquid delivered into the filter through the manifold 19; the washing liquid also fills the shell 1 and, being acted upon by the external delivery forces, passes through the layer of cake on the filtering surface 11 and through the filtering material 23 (FIG. 2) into the filtering element. The washing liquid passes a way similar to the above-described one of the filtrate.

For drying the cake, the remaining washing liquid is drained through the manifold 19 (FIG. 1) then the shell 1 is filled with compressed air which passes through the layer of cake, forces out the washing liquid and then follows the way described above.

Once the cake has been dried, the wedge gate 4 is opened and the vibrator 16 is started. Under the effect of vibration the cake breaks off from the filtering material 23 (FIG. 2), is disintegrated, moves over the inclined surface of the filter elements whereupon it passes through the openings between the edges 12 of the flat leaves 7 and is discharged directly through the discharge hole 3.

If necessary, the filter elements can be set in vibration in the course of filtration and cake washing.

Figure 3:
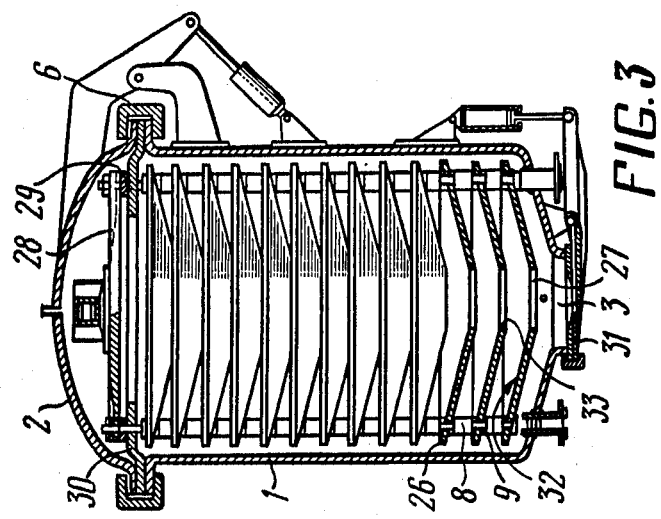
FIG. 3 is a longitudinal section of another embodiment of the vertical vibratory liquid filter according to the invention.

The filter illustrated in FIG. 3 functions in a similar way, its cake is discharged through the opening formed by the holes 27 and is also taken out through the discharge hole 3 without contacting the walls of the shell 1.

We claim:

1. A vertical vibratory liquid filter comprising a vertical shell; a feed manifold for feeding the suspension to be filtered into said shell; a cake-discharge hole located in the lower part of said shell; at least one upright drain pipe inside said shell, said drain pipe remaining upright inside said shell at all times; a filtrate-discharge manifold communicating with said drain pipe; filter elements secured on said drain pipe and accommodating spaces which communicate with said pipe, said filter elements being situated one above the other and spaced from each other along said pipe; said filter elements respectively having upper filtering surfaces inclined downwardly towards said discharge hole and having lower edges arranged above said discharge hole and situated on one side of said pipe while having opposite upper edges situated on the other side of said pipe; and a vibrator operatively connected with said filter elements for setting said filter elements in vibration for the removal of cake, whereby the orientation of said drain pipe and filter elements remains unchanged both during filtering operations and during cake-removal operations.

2. A filter as in claim 1 wherein the filter elements are in the form of inclined flat leaves.

3. A filter as in claim 2 wherein there are a pair of said drain pipes extending substantially parallel to each other with a plurality of said filter elements being carried by each of said drain pipes.

4. A filter as in claim 1 wherein said filter elements are in the form of cone-shaped plates arranged one above another with their apices pointing down and provided with a hole in the middle.

5. A filter as in claim 4 wherein a pair of said drain pipes respectively carry said cone-shaped plates and are respectively situated on opposite sides of an axis surrounded by said cone-shaped plates.

6. A filter as in claim 1 wherein said vibrator is situated in the interior of said shell.

* * * * *